April 3, 1928.
B. ROSENBAUM
DUPLEX VALVE AND MIXER
Filed Nov. 14, 1922
1,664,901
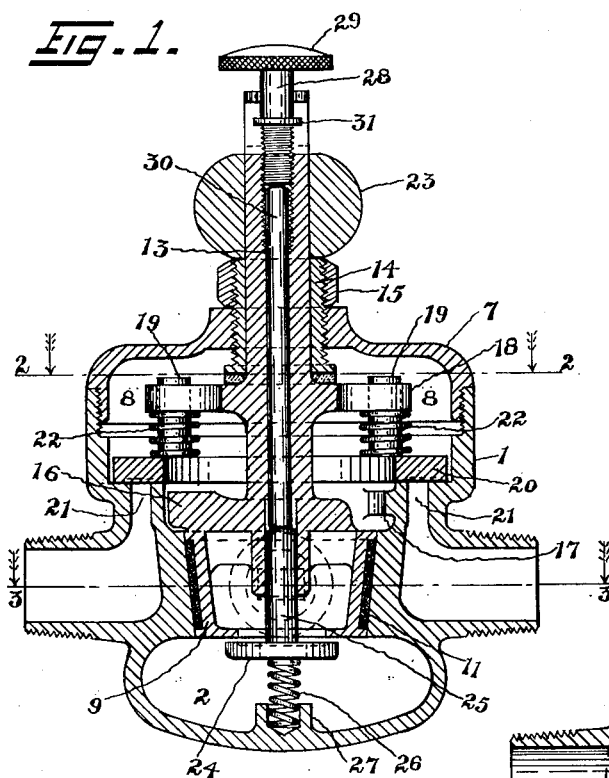
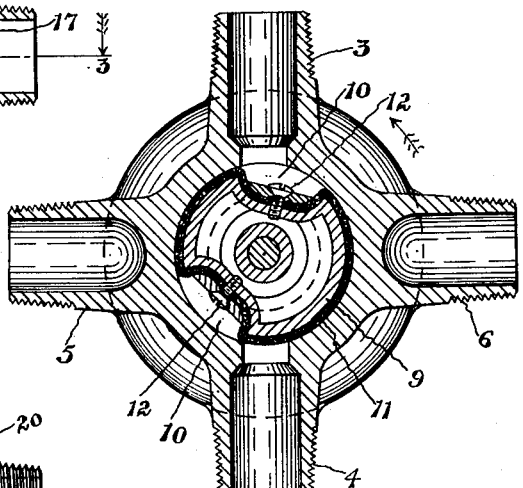
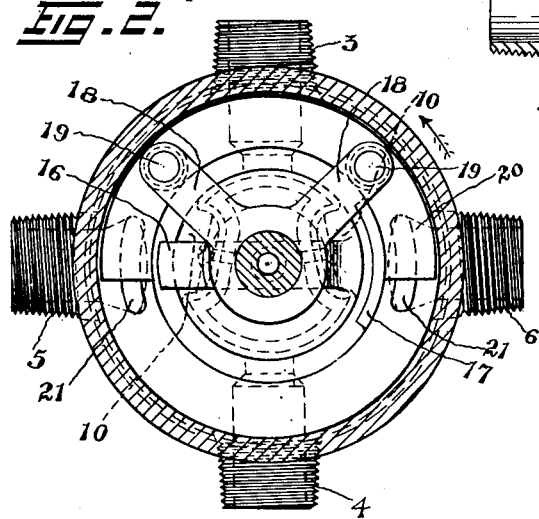
Witnesses:
Inventor:
Benjamin Rosenbaum,
By his Atty, Patented Apr. 3, 1928.

1,664,901

UNITED STATES PATENT OFFICE.

BENJAMIN ROSENBAUM, OF NEW YORK, N. Y.

DUPLEX VALVE AND MIXER.

Application filed November 14, 1922. Serial No. 600,863.

This invention relates to improvements in mixing valves for hot and cold fluids, the principal object of the invention being to provide an efficient and practical means for supplying water of any desired temperature to either of a plurality of outlets, the invention being an improvement in part on that shown in my contemporaneously pending application Serial No. 544,257, filed March 16, 1922.

Among the objects of the invention, it is aimed to provide an improved valve construction which will permit practically complete drainage of the fluid from the valve casing when in "off" position and which will be relatively simple, durable, compact and inexpensive.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a vertical central section of a device embodying the present invention; and Figs. 2 and 3 are transverse sectional views taken, respectively, on the lines 2—2 and 3—3 of Fig. 1, looking in the direction of the arrows.

The same characters of reference designate the same parts in the different figures of the drawings.

Referring to the drawings, 1 designates generally a metal casing having its lower portion so formed as to provide a mixing chamber 2, said casing being provided with a plurality of tubular exteriorly threaded nipples 3, 4 and 5 and 6 for the attachment of supply and delivery pipes or nozzles, two of such nipples, as 3 and 4, communicating with the center of the casing and the other two, as 5 and 6, communicating with the upper portion of the casing. The casing is provided at its upper end with an internal thread for the reception of an externally threaded cap 7 having an annular shoulder adapted to be seated on the end of the casing as shown in Fig. 1, the cap thus forming with the upper portion of the casing a discharge chamber 8.

Within the casing, immediately above the mixing chamber is formed a tapered seat for the reception of a hollow valve body 9 having in the lower portion of its circumference a pair of indentations 10 forming ports or channels between the wall of the casing and the valve body and adapted to establish communication between the supply nipples 3, 4 and the mixing chamber 2. It will be observed that these indentations are not exactly diametrically opposite each other, so that it is possible to entirely shut off one supply nipple and leave the other in full communication with the mixing chamber, as shown in Fig. 3, while, by rotating the valve body in the direction of the arrow shown in this figure, it will readily be seen that the two supply nipples can be so controlled as to permit any proportionate opening of one relatively to the other, so that if one of the nipples be connected to a hot water supply and the other to a cold water supply the temperature of the water in the mixing chamber can be regulated to any desired degree. The valve body is preferably provided with an encircling flexible packing 11, screws 12 being threaded into the indentations of the valve body to retain said packing therein.

Formed integral with the valve body is a hollow stem portion 13 which extends upwardly and takes a bearing in a bushing or sleeve 14 threaded in the cap 7, a nut 15 being threaded on the outer end of the sleeve thereby to lock the same in the cap. A transversely extending portion formed integral with the valve body and stem projects at one end thereof to form a lug 16 overhanging the valve seat and adapted to contact during the rotation of the valve in one direction or the other with either end of an abutment 17 formed upon the interior surface of the casing wall whereby the complete rotation of the valve is rendered impossible.

Above the transverse member 16, the valve stem carries a pair of radial arms 18, each provided at its free end with a vertical opening for the reception of a pin 19 carried by a semi-annular member or segment 20 seated within the casing and alternately adapted to overlie and close the upper ends of the ports 21 which form communication between the delivery chamber 8 and delivery nipples 5 and 6 or partially to close both ports 21, see Fig. 2, when in neutral or "off" position. A coiled spring 22 encircles each of the pins 19, and is compressed between its arm 18 and the segment 20, thereby normally retaining the segment in position on its seat. In the position shown in Fig. 2 the segment partially covers both of the delivery ports, while both inlet nipples 3 and 4 are shut off. If now the valve be rotated in the direction of the arrow until the nipple 3 is open, the outlet to nipple 6 will be open. This condition will exist as long as the valve is rotated in that direction, so that it will be possible to supply water of any temperature between the limits of the supply nipples 3 and 4, to the nipple 6. If it is desired to supply the water to nipple 5, the valve is rotated in the opposite direction until the port communicating with that nipple is uncovered and the outlet supply nipples are sufficiently open to furnish water at the desired temperature. An operating handle 23 is provided for permitting manual rotation of the valve.

When installed for use, the casing 1 may be embedded in a wall, with the cap 7 exposed. When so installed, the axis of the casing defined by the rod 30 extends horizontally, preferably with the shower outlet 5 extending upwardly and the bath outlet 6 extending downwardly. In this position, the segment 20 will only partially cover the openings to the two conduits 5 and 6 and, therefore, any water which is held or trapped in the pipe leading from the valve casing to the shower fixture may drain back through the conduit 5 into the chamber 8, and thence through the conduit 6 to the bath fixture which is open and usually lower than the shower fixture.

In order to permit regulation of the flow of water from the mixing chamber to the distributing or delivery chamber, the passageway through the bottom wall of the valve body 9 communicating with the mixing chamber is adapted to be closed by a valve or washer 24 having a plunger or stem 25 adapted to reciprocate within the lower end of the valve stem 13, the valve 24 being normally retained in contact with the bottom wall of the valve body 9 by means of a coil spring 26 having a cup shaped seat 27 within the mixing chamber. An adjusting member 28, having a milled head 29 is threaded into the upper end of the valve stem 13 and transmits its movement to the stem 25 through an idler rod 30 carried in the hollow valve stem 13. A collar 31 is preferably provided on the adjusting screw 28, within the valve stem 13 to prevent complete withdrawal of said screw, the upper end of the valve stem being diminished and bifurcated, and bent over so that its bifurcated end will engage the screw 28 between the collar 31 and the head 29, as shown.

It is believed that the operation of the device will be clearly understood from the foregoing description taken in connection with the drawings, from which it will be seen that I have provided a structure by means of which water of any desired temperature may be supplied to either of a pair of outlets. The particular embodiment of the device herein illustrated is believed to be particularly well adapted for use in places where there is a bath tub and a shower, since, as will readily be seen, the flow of water may be shifted from the bath tub to the shower and vice versa by the rotation of a single operating handle and the flow can be adjusted to suit the user by a slight rotation of the adjusting screw.

While I have described in detail the structure herein illustrated, it is to be understood that I do not limit my invention to the precise features of construction shown, as I am aware that many mechanical changes and modifications can be made therein without departing from the spirit and scope of the claims hereto appended.

I claim:

1. In a device of the class described, a valve casing having a plurality of inlets, a mixing chamber, a discharge chamber, and a plurality of outlets; and a rotatable valve member in said casing having axially extending passages to accommodate flowage from said inlets into said mixing chamber and from said mixing chamber into said discharge chamber, said valve member being rotatable to control the flow from said inlets through said outlets.

2. In a device of the class described, a valve casing having a plurality of inlets, a mixing chamber, a discharge chamber, and a plurality of outlets; and a rotatable valve member disposed intermediate said mixing chamber and discharge chamber, said valve member having axially extending passages to accommodate flowage from said inlets into said mixing chamber, and a centrally disposed axially extending passage to accommodate flowage from said mixing chamber into said discharge chamber, said valve member being rotatable to control the flowage from said inlets and through said outlets.

3. A device of the class described, comprising a casing forming a mixing chamber provided with a plurality of inlet ports, said casing also forming a discharge chamber provided with a plurality of discharge ports, a valve within said casing adapted to control communication between said inlet ports and said mixing chamber, said mixing chamber being in communication with said discharge chamber, means for operating said valve, and means positioned above said discharge ports and actuated by the operation of said valve-operating means for closing one of said discharge ports.

4. A device of the class described, comprising a casing forming a mixing chamber provided with a plurality of inlet ports, said casing also forming a discharge chamber provided with a plurality of discharge ports, a valve within said casing adapted to control communication between said inlet ports and said mixing chamber, said mixing chamber being in communication with said discharge chamber, means for operating said valve, and a segmental member seated above said discharge ports and operable by the actuation of said valve-operating means for closing one of said discharge ports.

5. A device of the class described, comprising a casing forming a mixing chamber provided with a plurality of inlet ports, said casing also forming a discharge chamber provided with a plurality of discharge ports, a valve within said casing adapted to control communication between said inlet ports and said mixing chamber, said mixing chamber being in communication with said discharge chamber, means for operating said valve, and a spring-pressed segmental member seated above said discharge ports and operable by the actuation of said valve-operating means for closing one of said discharge ports.

6. A device of the class described, comprising a casing forming a mixing chamber provided with a plurality of inlet ports, said casing also forming a discharge chamber provided with a plurality of discharge ports, a rotatable valve within said casing for controlling communication between said inlet ports and said mixing chamber, said mixing chamber being in communication with said discharge chamber, means for rotating said valve, and a spring-pressed segmental member seated above said discharge ports and operable on the rotation of the valve for closing either of said discharge ports.

7. A device of the class described, comprising a casing forming a mixing chamber provided with a plurality of inlet ports, said casing also forming a discharge chamber provided with a plurality of discharge ports, a rotatable valve within said casing for controlling communication between said inlet ports and said mixing chamber, said mixing chamber being in communication with said discharge chamber, means for rotating said valve, a spring-pressed segmental member seated above said discharge ports and operable on the rotation of the valve for closing either of said discharge ports, and means for limiting rotation of the valve in either direction.

8. A device of the class described, comprising a casing forming a mixing chamber provided with a plurality of inlet ports, said casing also forming a discharge chamber provided with a plurality of discharge ports, a valve within said casing adapted to control communication between said inlet ports and said mixing chamber, said mixing chamber being in communication with said discharge chamber, means for operating said valve, a segmental member seated above said discharge ports and operable by the actuation of said valve-operating means for closing one of said discharge ports, a pair of arms carried by said valve and each provided with an opening, a pair of pins carried by said segmental member reciprocable in said openings, and compression springs encircling said pins.

9. A device of the class described, comprising a casing forming a mixing chamber provided with a plurality of inlet ports, said casing also forming a discharge chamber provided with a plurality of discharge ports, a valve within said casing adapted to control communication between said inlet ports and said mixing chamber, said chambers communicating with each other through said valve, adjustable means operable against a compression member for controlling the opening of said communication, and means for closing either of said discharge ports while either of the inlet ports is in communication with the mixing chamber.

10. A device of the class described, comprising a casing forming a mixing chamber provided with a plurality of inlet ports, said casing also forming a discharge chamber provided with a plurality of discharge ports, a valve within said casing adapted to control communication between said inlet ports and said mixing chamber, said mixing chamber being in communication with said discharge chamber, means for operating said valve, and means seated above said discharge ports and operable by the actuation of said valve operating means for closing one of said discharge ports.

11. In a device of the class described, a valve casing having a plurality of inlets, a mixing chamber, a discharge chamber, and a plurality of outlets; and a rotatable valve member having depressions formed in the outer face thereof to accommodate flowage from said inlets into said mixing chamber, and an axially extending passage to direct the flow from said mixing chamber into said discharge chamber, said valve member being rotatable to control the flowage from said inlets and through said outlets.

12. In a device of the class described, a valve casing having a plurality of inlets, a mixing chamber, a discharge chamber, and a plurality of outlets; and a valve member in said casing, there being passages to direct the flowage from said inlets into said mixing chamber and from said discharge chamber into said outlets both in one direction, and other passages for directing the flowage from said mixing chamber into said discharge chamber in the opposite direction, said valve member controlling the flowage from said inlets and out through said outlets.

13. In a valve device, a casing having a pair of compartments connected by a passage, the lateral wall of said passage having ports therein, said casing having conduit connections leading to said ports and separate from said compartments, said casing also having a pair of other conduit connections with conduit passages leading to one of said compartments, a valve element in said casing passage and cooperating with said ports to control communication between said ports and the other of said compartments, selectively depending upon the angular adjustment of said valve element, means also operated by said valve element for controlling communication between said one of the compartments and said second pair of conduit connections, said valve element having a channel therethrough establishing communication between said compartments, whereby when the valve element is operated in one direction to establish communication between one of the ports and said other compartment, communicating will be established between that port and one of the said other conduit connections, depending upon the angular direction in which the valve element is operated, said means operated by the valve element for controlling communication between the compartments and the second ports being so related and connected to the valve element that direct communication between said second pair of conduit connections will be established when the valve elements is in "off" position where said ports are closed.

BENJAMIN ROSENBAUM.